United States Patent
Doi

(10) Patent No.: US 7,681,115 B2
(45) Date of Patent: Mar. 16, 2010

(54) TEXT EDITING AND REPRODUCTION APPARATUS, CONTENT EDITING AND REPRODUCTION APPARATUS, AND TEXT EDITING AND REPRODUCTION METHOD

(75) Inventor: Kazumi Doi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1064 days.

(21) Appl. No.: 11/349,746

(22) Filed: Feb. 8, 2006

(65) Prior Publication Data

US 2007/0055518 A1   Mar. 8, 2007

(30) Foreign Application Priority Data

Aug. 31, 2005   (JP) ............... 2005-252117

(51) Int. Cl.
*G06F 17/21* (2006.01)
*G06F 3/00* (2006.01)
*G09B 5/06* (2006.01)

(52) U.S. Cl. ............... 715/203; 715/716; 434/307 A

(58) Field of Classification Search ............ 715/203, 715/716; 434/370 A; 348/468
See application file for complete search history.

(56) References Cited

U.S. PATENT DOCUMENTS

| | | | | |
|---|---|---|---|---|
| 5,768,396 A * | 6/1998 | Sone | ............... | 381/61 |
| 5,886,275 A * | 3/1999 | Kato et al. | ............... | 84/609 |
| 5,919,047 A * | 7/1999 | Sone | ............... | 434/307 A |
| 5,953,290 A * | 9/1999 | Fukuda et al. | ............... | 434/307 A |
| 6,053,740 A * | 4/2000 | Nakata et al. | ............... | 434/307 A |
| 6,062,867 A * | 5/2000 | Torimura | ............... | 434/307 A |
| 6,490,550 B1 * | 12/2002 | Hiri | ............... | 704/201 |
| 6,582,235 B1 * | 6/2003 | Tsai et al. | ............... | 434/307 A |

(Continued)

FOREIGN PATENT DOCUMENTS

JP   2004-215203   7/2004

(Continued)

OTHER PUBLICATIONS

Matthias Braun, et al. "Motion-Compensating Real-Time Format Converter for Video on Multimedia Displays", Proceedings of the International Conference on Image Processing, pp. 125-128. vol. 1, Oct. 26-29, 1997, Santa Barbara, CA, Oct. 26, 1997, Los Alimitos CA.

(Continued)

*Primary Examiner*—Adam L Basehoar
*Assistant Examiner*—Yasin Patterson
(74) *Attorney, Agent, or Firm*—Katten Muchin Rosenman LLP

(57) ABSTRACT

A text editing and reproduction apparatus capable of maintaining the continuity of text data display and performing high-quality content reproduction. An ornament time information addition section adds ornament elapsed time which indicates elapsed time for ornament display of a text sample and which is display start time for a first text sample to the first text sample, and adds ornament elapsed time which indicates elapsed time for ornament display of the text sample and which is display start time for a second text sample to the second text sample. A text data reproduction process section performs a reproduction process while maintaining continuity between the first text sample and the second text sample by reproducing and displaying the first text sample from the ornament elapsed time to time when the text sample is separated and by reproducing and displaying the second text sample from the ornament elapsed time.

12 Claims, 16 Drawing Sheets

U.S. PATENT DOCUMENTS

| | | | |
|---|---|---|---|
| 7,058,889 B2* | 6/2006 | Trovato et al. | 715/716 |
| 7,165,264 B1* | 1/2007 | Westrick | 725/40 |
| 7,319,468 B2* | 1/2008 | Baker | 345/629 |
| 2001/0030710 A1* | 10/2001 | Werner | 348/467 |
| 2002/0031187 A1 | 3/2002 | Kim | |
| 2003/0161425 A1* | 8/2003 | Kikuchi | 375/354 |
| 2004/0146285 A1* | 7/2004 | Matsui et al. | 386/98 |
| 2004/0231001 A1 | 11/2004 | Kisliakov | |
| 2004/0241632 A1* | 12/2004 | Tsukamoto et al. | 434/307 A |
| 2005/0078948 A1* | 4/2005 | Yoo et al. | 386/95 |
| 2005/0109195 A1* | 5/2005 | Haruyama et al. | 84/645 |
| 2005/0219219 A1* | 10/2005 | Momosaki et al. | 345/169 |
| 2006/0023720 A1* | 2/2006 | Ido et al. | 370/394 |
| 2006/0032362 A1* | 2/2006 | Reynolds et al. | 84/601 |
| 2006/0152622 A1* | 7/2006 | Tan et al. | 348/473 |

FOREIGN PATENT DOCUMENTS

JP    2004-254281    9/2004

OTHER PUBLICATIONS

European Search Report and Annex to the European Search Report dated Feb. 5, 2008, for corresponding European Application EP 06 00 3138.

* cited by examiner

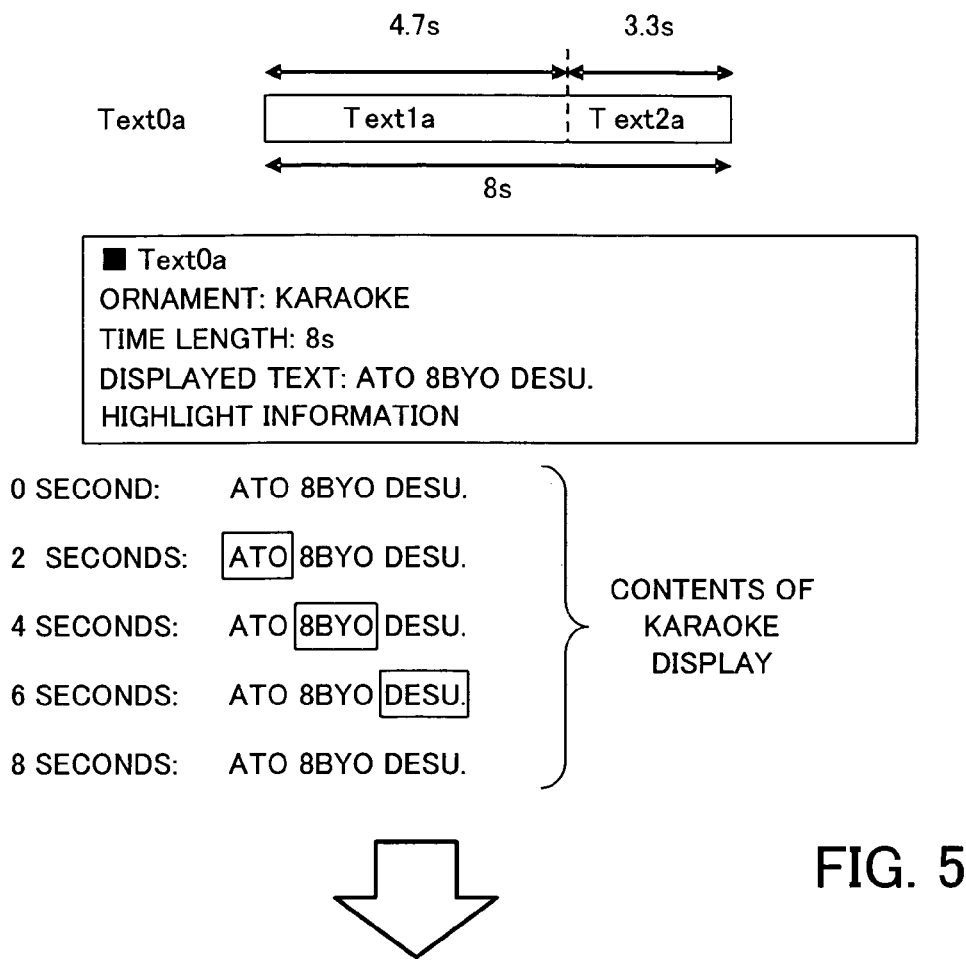
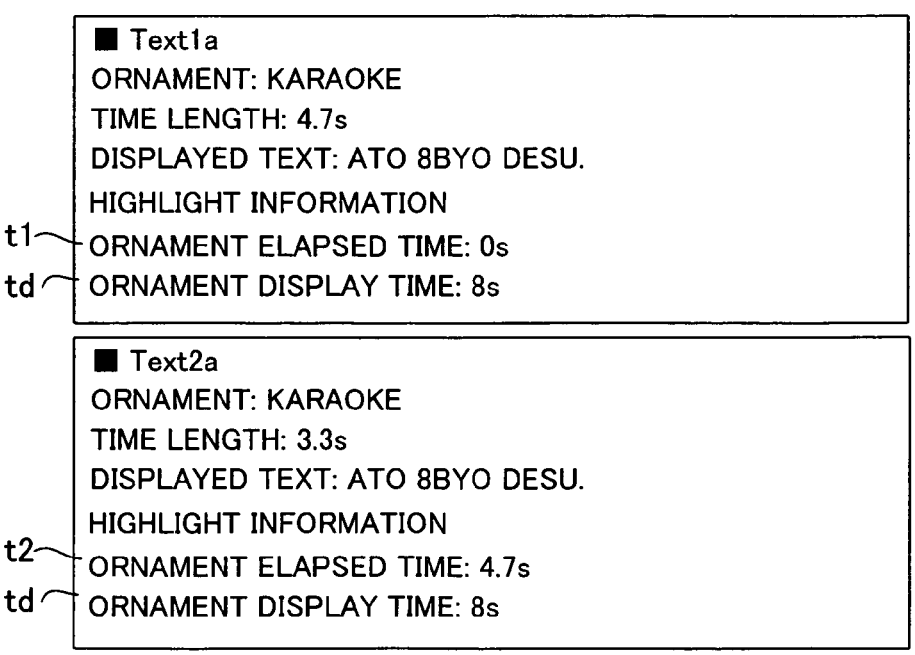
FIG. 5

FIG. 13 (PRIOR ART)

```
class TextSample {
    unsigned
        int(16)         text_length;     // TEXT LENGTH
    unsigned int(8)     text[text-length]; // TEXT CHARACTER STRING
    TextSampleModifierBox text_modifier[]; // ORNAMENT INFORMATION
}
```

| TEXT CHARACTER STRING | ORNAMENT 1 | ORNAMENT 2 | ORNAMENT 3 |
|---|---|---|---|

TEXT LENGTH INFORMATION

TEXT SAMPLE

◆ EXAMPLE OF ORNAMENT INFORMATION

```
class TextKaraokeBox() extends TextSampleModifierBox ('krok')
{
    unsigned
        int(32)         highlight-start-time ;  // HIGHLIGHT START TIME
    unsigned
        int(32)         highlight-end-time ;    // HIGHLIGHT END TIME
    unsigned
        int(16)         entry_count ;           // NUMBER OF ENTRIES
    for (i=1; i<=entry-count; i++) {
        unsigned
            int(16)     startcharoffset ;       // HIGHLIGHT START CHARACTER
        unsigned
            int(16)     endcharoffset ;         // HIGHLIGHT END CHARACTER
    }
}
```

REPEAT BY TIMES THE NUMBER OF WHICH IS THE SAME AS NUMBER OF ENTRIES

■Text0
ORNAMENT: SCROLL
TIME LENGTH: 15s
DISPLAYED TEXT: GENZAIJIKOKU WA 10JI30PUN CHODO DESU.
0 SECOND
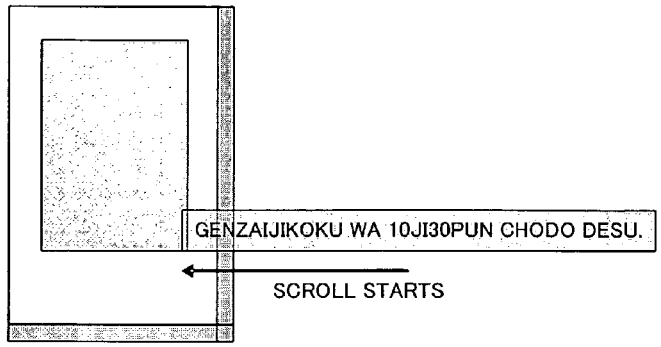
SCROLL STARTS
7.5 SECONDS
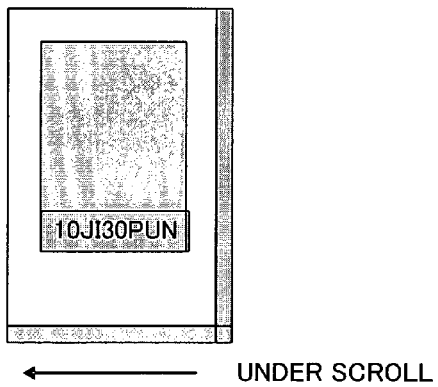
UNDER SCROLL
15 SECONDS
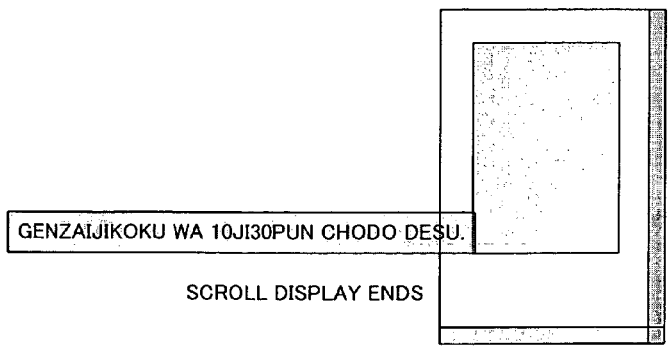
SCROLL DISPLAY ENDS
FIG. 14
(PRIOR ART)

TEXT EDITING AND REPRODUCTION APPARATUS, CONTENT EDITING AND REPRODUCTION APPARATUS, AND TEXT EDITING AND REPRODUCTION METHOD

CROSS-REFERENCE TO RELATED APPLICATIONS

This application is based upon and claims the benefits of priority from the prior Japanese Patent Application No. 2005-252117, filed on Aug. 31, 2005, the entire contents of which are incorporated herein by reference.

BACKGROUND OF THE INVENTION (1) Field of the Invention

This invention relates to a text editing and reproduction apparatus, a content editing and reproduction apparatus, and a text editing and reproduction method, and, more particularly, to a text editing and reproduction apparatus for editing and reproducing text data, a content editing and reproduction apparatus for editing and reproducing content composed of video, audio, and text, and a text editing and reproduction method for editing and reproducing text data.

(2) Description of the Related Art

In recent years content delivery services for delivering various contents to terminal units, such as cellular phones, have widely been used. Stream transmission based on the Moving Pictures Experts Group 4 (MPEG4) standard has widely been used for providing content delivery services and the types of products using MPEG4 have increased.

MPEG4 is an animation format standard for delivering high-quality animation data even over low-speed lines, such as cellular phones or telephone lines. It is expected that MPEG4 will widely be used for, for example, digital television (video conferences, video telephones, and the like), delivery of video or music, for example, via the Internet or to cellular phones, and interactive media (online games and the like).

A basic media file format prescribed by MPEG4 is called MP4. Content in the MP4 file format includes a header section where header information, such as conditions under which media data is reproduced, is stored and a media data section where the media data itself is stored. To edit such content by separating and extracting, usually video data is used as reference.

FIG. 12 shows how to separate and extract media data. Media data includes coded video and audio. That is to say, media data includes video data V, audio data A, and text data T and is also referred to as an elementary stream (ES).

When data included in an arbitrary time interval is separated and extracted from the media data, the leading frame of the separated interval should be an intra-coded (I) frame. When video data V separated and extracted is reproduced, it is necessary that the leading frame should be reproducible by itself. This is why when media data is separated and extracted, the separation is performed so as to make an intra-coded (I) frame which is not coded on the basis of a correlation between frames the leading frame.

As shown in FIG. 12, for example, it is assumed that the interval between 10 and 20 seconds (interval [10 s, 20 s]) is designated as an interval to be extracted. To meet the above condition (that the leading frame of video data V included in a separated interval should be an I frame), the interval [9.8 s, 20.3 s] is actually extracted so that data at 10 seconds and data at 20 seconds will be included.

If video data V included in the interval [9.8 s, 20.3 s] is separated and extracted, then audio data A and text data T included in the interval [9.8 s, 20.3 s] are also separated and extracted. Accordingly, if the interval [10 s, 20 s] is designated, then the determination that the video data V, the audio data A, and the text data T included in the interval [9.8 s, 20.3 s] should be separated is made.

A technique for changing the structure of text data to suit it to streaming has conventionally been proposed (see, for example, Japanese Patent Laid-Open Publication No. 2004-254281, paragraphs [0085]-[0108] and FIG. 1).

As stated above, when media data is separated and extracted, intervals of audio data and text data which are to be separated are determined with video data as reference. In many cases, however, the time length of one sample of text data is several seconds, so there may be a separation point in a sample.

The structure of text data will now be described. FIG. 13 shows syntax for text data. The TimedText syntax is shown as an example of syntax for one sample of text data (text sample) (text data in which time information is included in ornament information is referred to as TimedText).

TimedText is included in an ES and includes 4-byte text length information, a text character string, and ornament information in that order. Data size information regarding this text sample, time information which specifies when to display this text sample on a screen, display information which specifies how to display this text sample, and the like are stored in a header section (not shown).

Syntaxes for ornament information differ among different ornament methods. Karaoke and scroll delay will be shown as examples of ornament information. Karaoke is ornament by which characters are highlighted at designated time (for example, a portion of lyrics to sing to music is displayed in color). In the case of the ornament information of karaoke, highlight start time is designated first by using four bytes, then the number of entries, that is to say, of highlight portions in a text sample is designated, and then a set of highlight end time, a highlight start character, and a highlight end character is repeated by times the number of which is the same as that of the entries.

It is assumed that the text data shown in FIG. 12 is a sample displayed for 15 seconds. Then the text data is separated into 9.8-second text data and 5.2-second text data. When the video/audio data is edited, time information in a header section for the text data is edited so as to display these pieces of text data for 9.8 seconds and 5.2 seconds respectively. By doing so, the correspondence between the text data and the video/audio data separated is maintained.

Traditionally, however, when text data separated and time-modified is packed in a file and is then reproduced, continuity is not maintained and the text data is displayed very unnaturally.

This problem will now be described by using FIGS. 14 through 16. FIG. 14 shows the operation of displaying text data before separation. It is assumed that a text sample T0 (Text0) is the text "GENZAIJIKOKU WA 10JI30PUN CHODO DESU" (which is a Japanese text corresponding to the English text "the time is just half past ten"), that the text sample T0 is horizontally scrolled from the right to the left of a screen, and that the text sample T0 is displayed for 15 seconds. As shown in FIG. 14, usually the displayed text "GENZAIJIKOKU WA 10JI30PUN CHODO DESU" is scrolled from the right to the left of the screen for 15 seconds.

On the other hand, if the text data T is separated at 9.8 seconds with a video I frame as reference, then the text data T is separated into 9.8-second text data and 5.2-second text data.

FIG. 15 shows the operation of displaying the 9.8-second text data. When the video/audio data included in the interval [0 s, 9.8 s] is edited, the text data before the separation point is time-modified to 9.8 seconds. As a result, the text "GENZAIJIKOKU WA 10JI30PUN CHODO DESU" becomes a sample which is horizontally scrolled from the right to the left of the screen and which is displayed for 9.8 seconds.

In this case, a scroll speed can be calculated in the following way. It is assumed that one row on the screen of the cellular phone is made up of 136 pixels and that one character is made up of 12 dots. The text "GENZAIJIKOKU WA 10JI30PUN CHODO DESU" is made up of 32 characters, so (136+12×32)/9.8=53.1 dots/s (1 pixel=1 dot).

FIG. 16 shows the operation of displaying the 5.2-second text data. When the video/audio data included in the interval [9.8 s, 20.3 s] is edited, the text data following the separation point is time-modified to 5.2 seconds. As a result, the text "GENZAIJIKOKU WA 10JI30PUN CHODO DESU" becomes a sample which is horizontally scrolled from the right to the left of the screen and which is displayed for 5.2 seconds. In this case, a scroll speed is (136+12×32)/5.2=100 dots/s The media data included in the interval [0 s, 9.8 s] is packed in a file (file f1) and the media data included in the interval [9.8 s, 20.3 s] is packed in a file (file f2). When the two files f1 and f2 are reproduced in succession, the text "GENZAIJIKOKU WA 10JI30PUN CHODO DESU" is displayed twice at different scroll speeds (the first text is displayed and is scrolled for 9.8 seconds and the second text is displayed and is scrolled for 5.2 seconds). Accordingly, unnatural reproduction is performed. (If the text data is separated into 14-second text data and 1-second text data, then the second text is displayed and is scrolled for 1 second. In this case, the second text disappears from the screen in a short time, so a user feels a deep malaise.)

The most natural method for displaying the text "GENZAIJIKOKU WA 10JI30PUN CHODO DESU" is as follows. When the two files f1 and f2 are reproduced in succession, part of the text packed in the file f1 should be displayed for 9.8 seconds and the rest of the text packed in the file f2 should be displayed for 5.2 seconds. That is to say, the text "GENZAIJIKOKU WA 10JI30PUN CHODO DESU" packed in the files f1 and f2 should be displayed once and be scrolled at a speed of 34.7 (=(136+12×32)/15) dots/s for a total of 15 seconds.

Traditionally, however, when media data is edited by performing separation and extraction with video data as reference, text data is simply time-modified with reference to the video/audio data. As a result, when the text data is reproduced, continuity is not maintained and the text data is displayed unnaturally. Moreover, the display of the text data is not synchronized with video and audio. These problems are not taken into consideration at all in the conventional technique (Japanese Patent Laid-Open Publication No. 2004-254281).

SUMMARY OF THE INVENTION

The present invention was made under the background circumstances described above. An object of the present invention is to provide a text editing and reproduction apparatus for performing high-quality text data reproduction by maintaining the continuity of the display of text data.

Another object of the present invention is to provide a content editing and reproduction apparatus for performing high-quality text data reproduction by maintaining the continuity of the display of text data at the time of editing and reproducing composite content.

Still another object of the present invention is to provide a text editing and reproduction method for performing high-quality text data reproduction by maintaining the continuity of the display of text data.

In order to achieve the above first object, a text editing and reproduction apparatus for editing and reproducing text data is provided. This text editing and reproduction apparatus comprises a text data separation section for treating, in the case of separating a text sample which is one sample of the text data at the time of separating and editing the text data, text data before a separation point as a first text sample, and for treating text data following the separation point as a second text sample; an ornament time information addition section for adding first ornament elapsed time which indicates elapsed time for ornament display of the text sample and which is display start time for the first text sample to the first text sample, and for adding second ornament elapsed time which indicates elapsed time for ornament display of the text sample and which is display start time for the second text sample to the second text sample; and a text data reproduction process section for performing a reproduction process while maintaining continuity between the first text sample and the second text sample by reproducing and displaying the first text sample from the first ornament elapsed time to time when the text sample is separated and by reproducing and displaying the second text sample from the second ornament elapsed time.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 shows ornament time information added to text samples.

FIG. 13 shows syntax for text data.

FIG. 14 shows the operation of displaying text data before separation.

DESCRIPTION OF THE PREFERRED EMBODIMENTS

Figure 1:
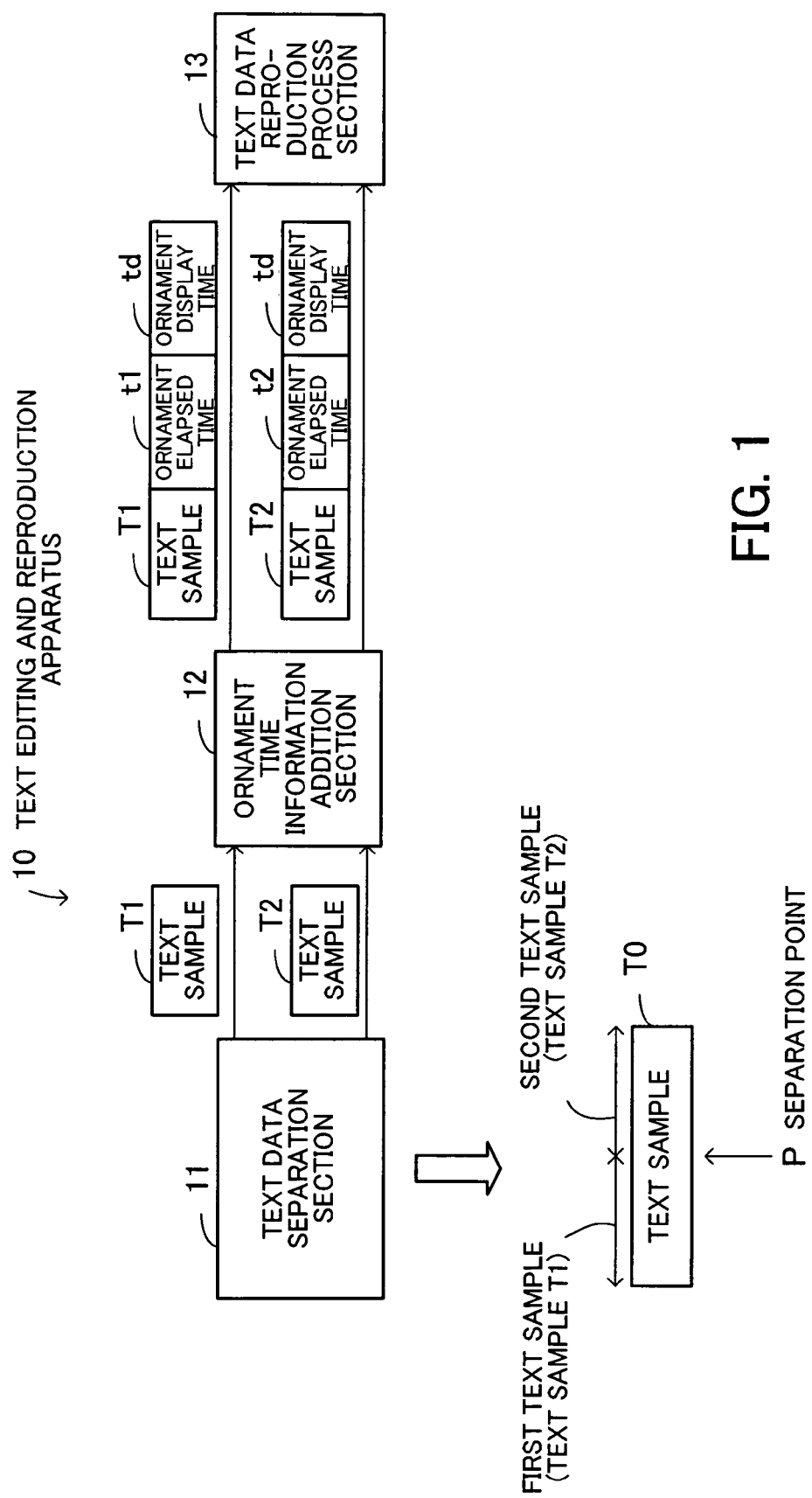
FIG. 1 is a view for describing the principles underlying a text editing and reproduction apparatus according to the present invention.

Embodiments of the present invention will now be described with reference to the drawings. FIG. 1 is a view for describing the principles underlying a text editing and reproduction apparatus according to the present invention. A text editing and reproduction apparatus 10 comprises a text data separation section 11, an ornament time information addition section 12, and a text data reproduction process section 13 and edits and reproduces text data.

The text data separation section 11 separates text data at the time of editing the text data. If a text sample T0, being one sample of the text data, is separated at a separation point P, the text data separation section 11 treats text data before the separation point P as a first text sample (text sample T1) and treats text data following the separation point P as a second text sample (text sample T2).

The ornament time information addition section 12 generates ornament elapsed time as ornament time information and adds it to the text samples T1 and T2. The ornament elapsed time is time information indicative of elapsed time for ornament display of the text sample T0.

First ornament elapsed time (ornament elapsed time t1) is added to the text sample T1. The ornament elapsed time t1 is time information indicative of display start time for the text sample T1.

Second ornament elapsed time (ornament elapsed time t2) is added to the text sample T2. The ornament elapsed time t2 is time information indicative of display start time for the text sample T2.

To display text data in accordance with a design or a layout set is referred to as ornament display. For example, a display method, such as scrolling displayed text data from the right to the left of a screen, is included in this ornament display.

To scroll the displayed text data, the ornament time information addition section 12 generates ornament display time td and adds it to the text samples T1 and T2 as ornament time information, in addition to the ornament elapsed time t1 and the ornament elapsed time t2. The ornament display time td is time information indicative of time taken to perform ornament display of the text sample T0 before the separation.

Accordingly, the ornament elapsed time t1 and the ornament display time td are added to the text sample T1 and the ornament elapsed time t2 and the ornament display time td are added to the text sample T2. How to add these pieces of ornament time information and perform text reproduction will be described later with reference to FIGS. 2 through 7.

The text data reproduction process section 13 reproduces and displays the text sample T1 from the ornament elapsed time t1 to the time when the text sample T0 is separated, and reproduces and displays the text sample T2 from the ornament elapsed time t2. By doing so, the text data reproduction process section 13 performs a reproduction process while maintaining continuity between the text samples T1 and T2.

To scroll the displayed text data, the text data reproduction process section 13 calculates an ornament display speed of the text sample T0 from the ornament display time td. The text data reproduction process section 13 reproduces and displays the text sample T1 from the ornament elapsed time t1 to the time when the text sample T0 is separated at the ornament display speed found. The text data reproduction process section 13 then reproduces and displays the text sample T2 from the ornament elapsed time t2 at the ornament display speed. By doing so, the text data reproduction process section 13 performs a reproduction process while maintaining continuity between the text samples T1 and T2.

Figure 2:
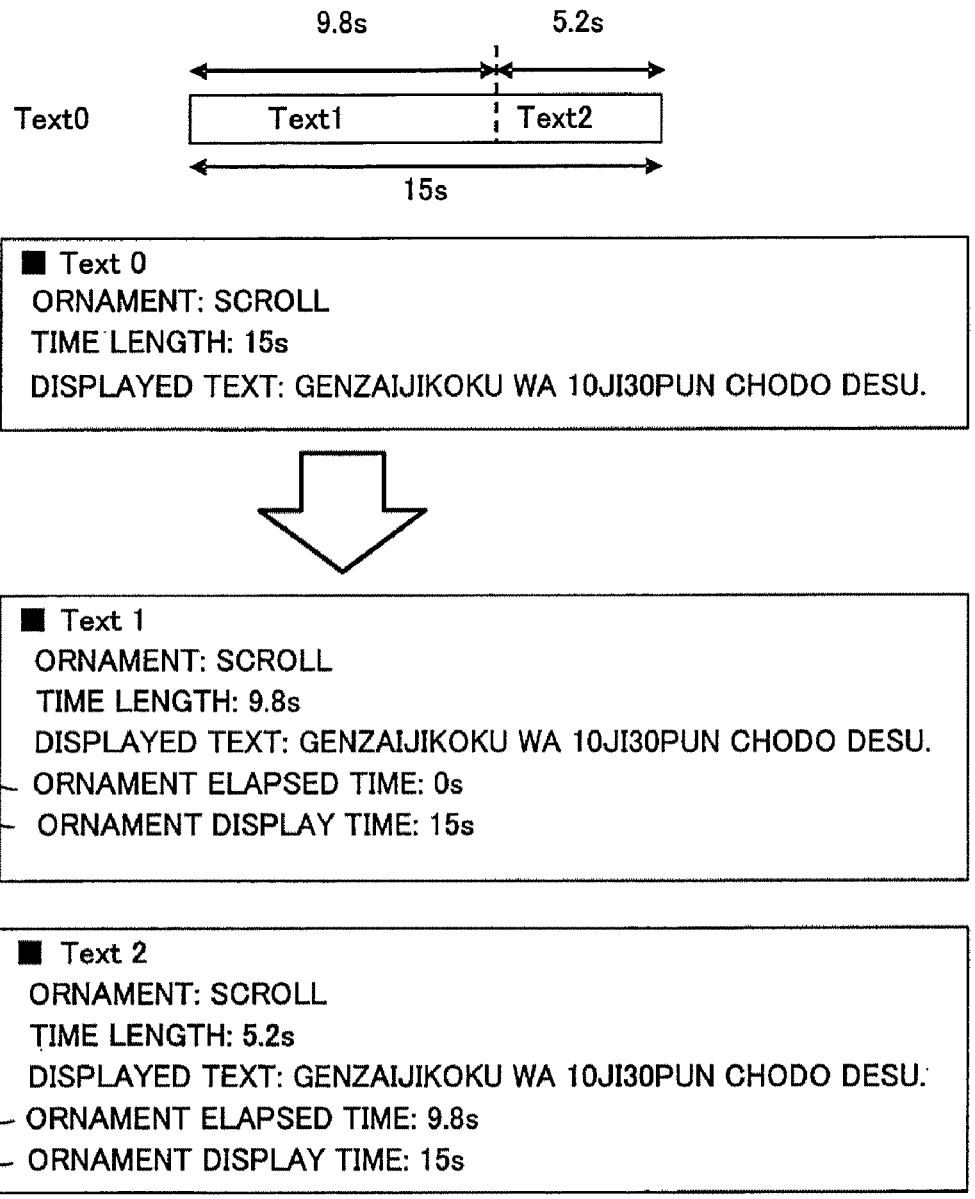
FIG. 2 shows ornament time information added to text samples.
Figure 3:
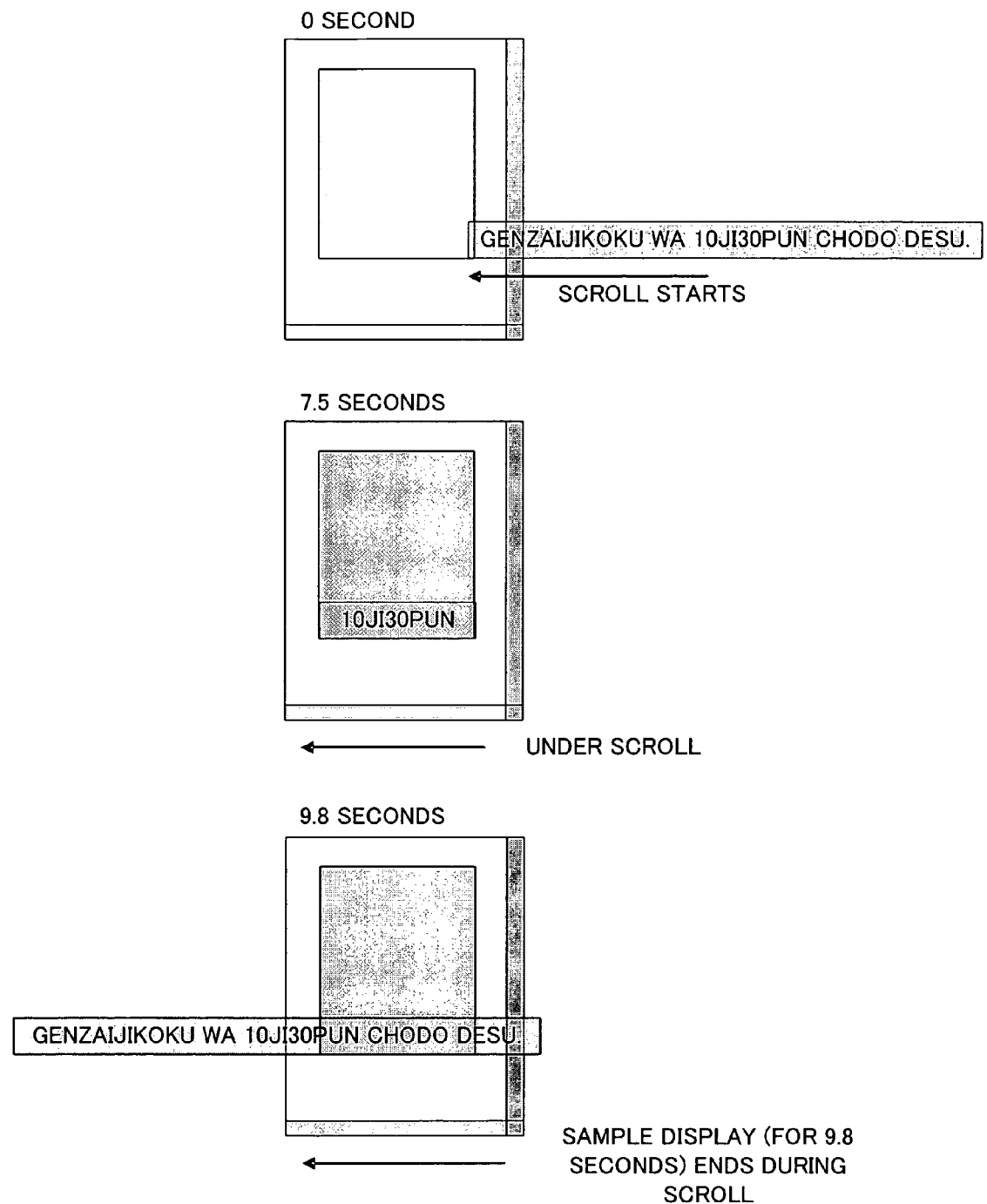
FIG. 3 shows the operation of displaying the text sample.
Figure 4:
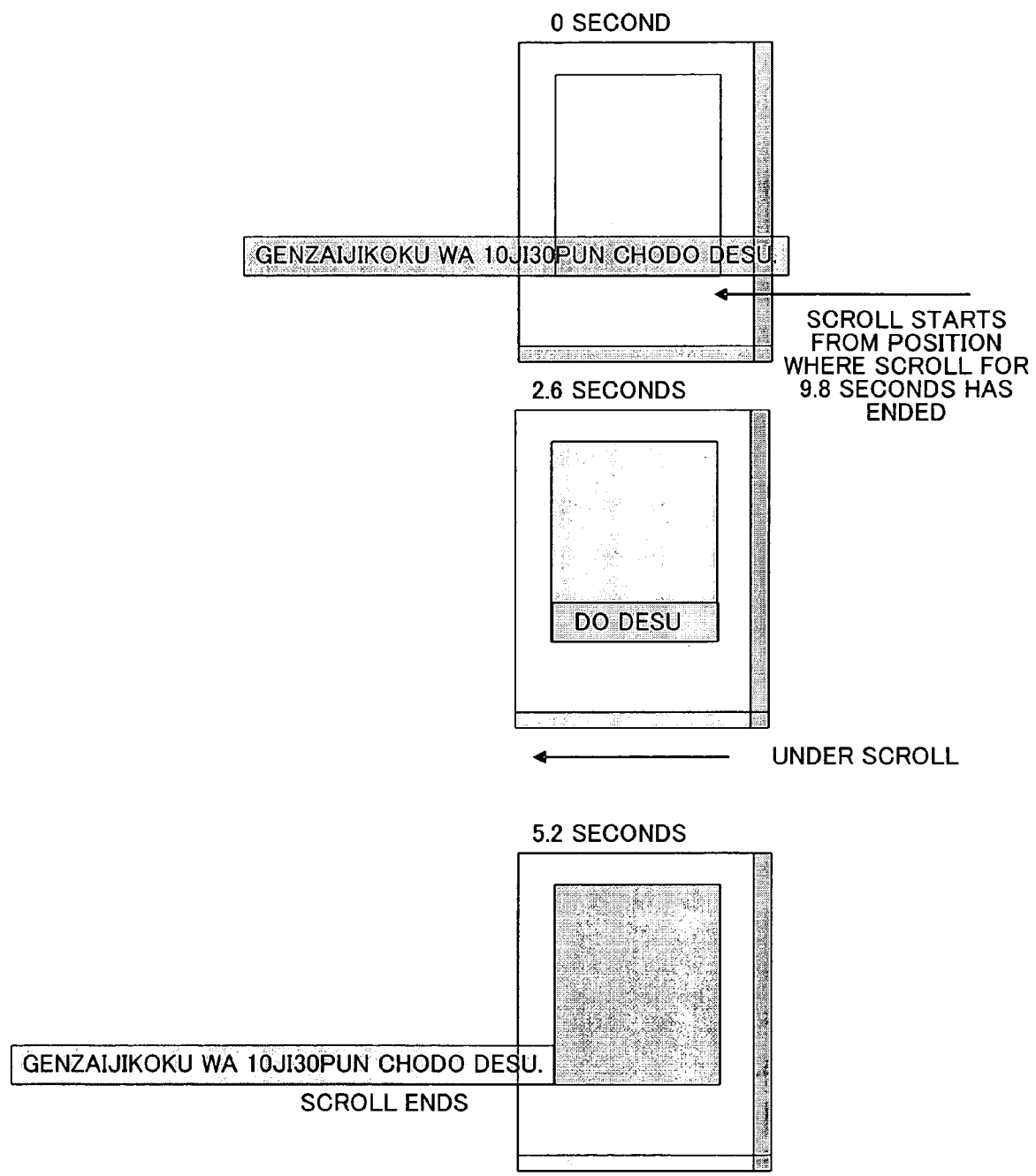
FIG. 4 shows the operation of displaying the text sample.
Figure 6:
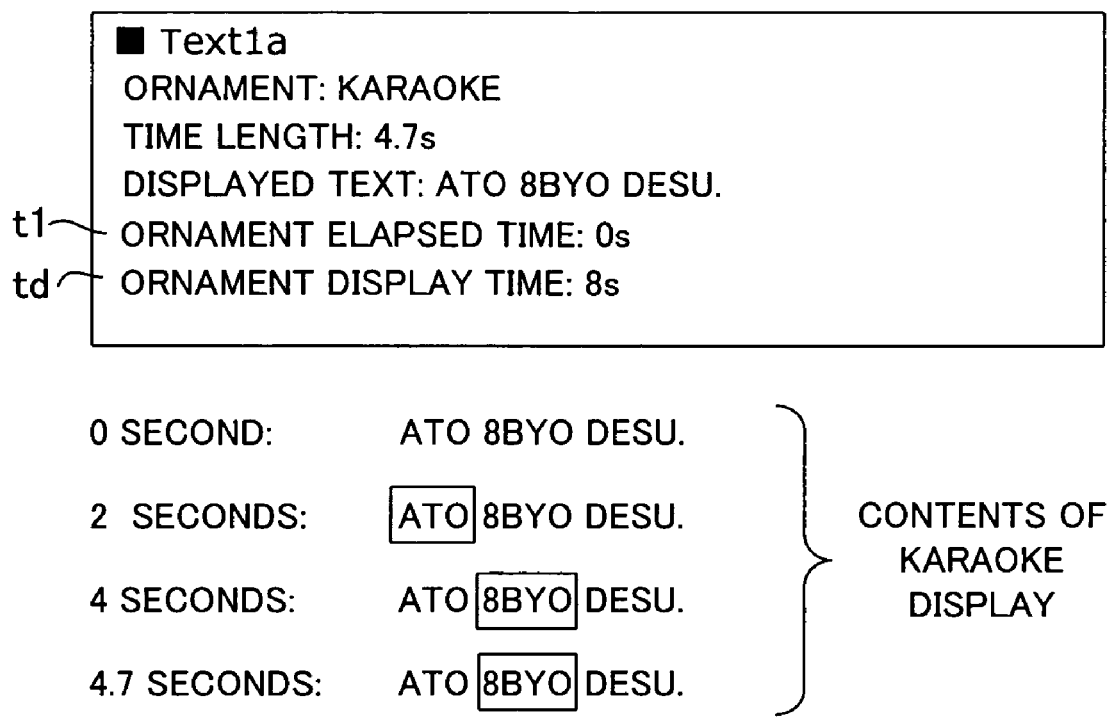
FIG. 6 shows the operation of displaying the text sample.
Figure 7:
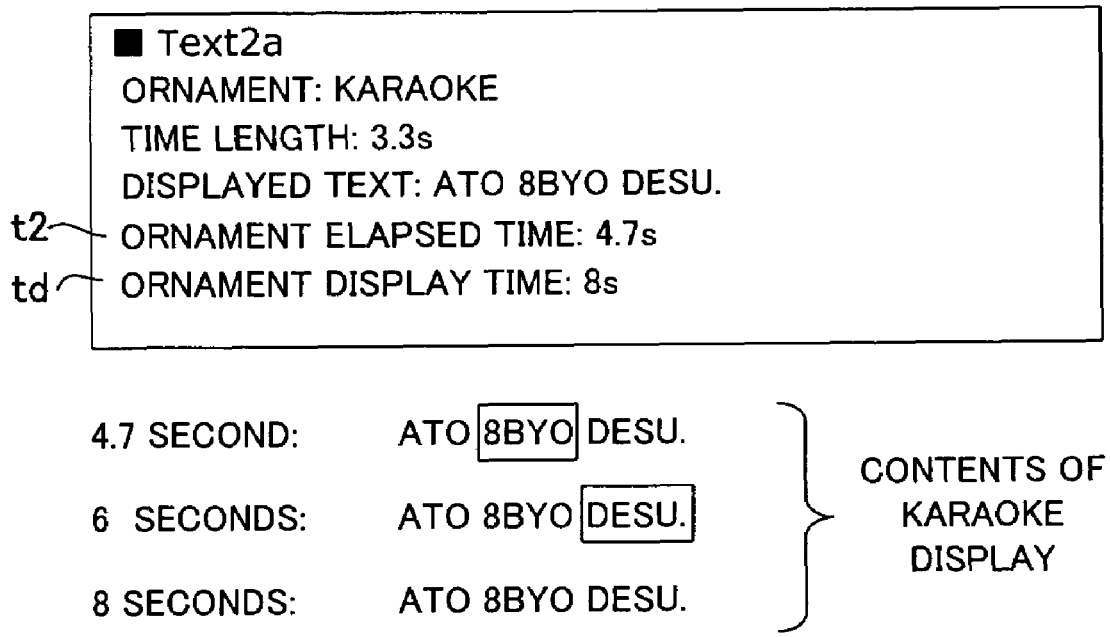
FIG. 7 shows the operation of displaying the text sample.

Next, ornament time information added to the text samples T1 and T2 will be shown and how to reproduce and display the text samples T1 and T2 while maintaining continuity between them will be described in detail by using concrete examples (examples of scroll display are shown in FIGS. 2 through 4 and examples of karaoke display, being a kind of highlight display, are shown in FIGS. 5 through 7).

An example of scroll display will now be described. FIG. 2 shows ornament time information added to the text samples T1 and T2. It is assumed that ornament of the text sample T0 (Text0) is scroll (from the right to the left, for example, of a screen), that the text sample T0 is 15 seconds in time length, and that the text sample T0 is "GENZAIJIKOKU WA 10JI30PUN CHODO DESU" (which is a Japanese text corresponding to the English text "the time is just half past ten".

The text sample T0 is separated into the 9.8-second text sample T1 (Text1) and the 5.2-second text sample T2 (Text2). In this case, the text sample T1 includes information, such as the ornament of scroll, the time length of 9.8 seconds, and the displayed text of "GENZAIJIKOKU WA 10JI30PUN CHODO DESU". In addition to these pieces of information, the ornament time information addition section 12 adds pieces of ornament time information that the ornament elapsed time t1 is 0 seconds and that the ornament display time td is 15 seconds (the ornament of scroll and the time length of 9.8 seconds are included in header information and the other pieces of information are included in an ES).

The ornament elapsed time t1 is time information indicative of elapsed time for ornament display of the text sample T0. Ornament display of the text sample T0 begins with display of the text sample T1 at 0 second, so the ornament elapsed time t1 is set to 0 seconds (time which elapsed after the beginning of the display is 0 seconds). The ornament display time td indicates time taken to perform ornament display of the text sample T0, so the ornament display time td is set to 15 seconds.

On the other hand, the text sample T2 includes information, such as the ornament of scroll, the time length of 5.2 seconds, and the displayed text of "GENZAIJIKOKU WA 10JI30PUN CHODO DESU". In addition to these pieces of information, the ornament time information addition section 12 adds pieces of ornament time information that the ornament elapsed time t2 is 9.8 seconds and that the ornament display time td is 15 seconds.

The ornament elapsed time t2 is time information indicative of elapsed time for ornament display of the text sample T0. After the text sample T1 is displayed for 9.8 seconds, display of the text sample T2 begins. Accordingly, the ornament elapsed time t2 is set to 9.8 seconds (time which elapsed after the beginning of the display is 9.8 seconds). The ornament display time td is set to 15 seconds.

FIG. 3 shows the operation of displaying the text sample T1. When the text data reproduction process section 13 receives the text sample T1 to which the ornament elapsed time t1 and the ornament display time td have been added, the text data reproduction process section 13 first finds an ornament display speed (scroll speed) on the basis of the ornament display time td.

It is assumed that the text sample T0 is displayed on a screen of a cellular phone, that one row on the screen of the cellular phone is made up of 136 pixels, and that one character is made up of 12 dots. The text "GENZAIJIKOKU WA 10JI30PUN CHODO DESU" is made up of 32 characters, so the scroll speed is given by (136+12×32)/15=34.7 dots/s (1 pixel=1 dot)

The ornament elapsed time t1 is 0 seconds. Therefore, the head of the text sample T1 is displayed first and the text sample T1 is scrolled from the right to the left of the screen at a scroll speed of 34.7 dots/s. The text sample T1 is scrolled at a scroll speed of 34.7 dots/s, so display of the text sample T1 terminates during the scroll.

FIG. 4 shows the operation of displaying the text sample T2. When the text data reproduction process section 13 receives the text sample T2 to which the ornament elapsed time t2 and the ornament display time td have been added, the text data reproduction process section 13 first finds an ornament display speed (scroll speed) on the basis of the ornament display time td. The scroll speed is 34.7 dots/s. This is the same with FIG. 3.

The ornament elapsed time t2 is 9.8 seconds. Therefore, display of the text sample T2 begins at a position where the text sample T2 is after being scrolled from the right to the left of the screen at a scroll speed of 34.7 dots/s for 9.8 seconds. The displayed text sample T2 is scrolled for 5.2 seconds and then display of the text sample T2 terminates.

As stated above, the text "GENZAIJIKOKU WA 10JI30PUN CHODO DESU" is displayed at a scroll speed of 34.7 dots/s for 9.8 seconds. Display of the text "GENZAIJIKOKU WA 10JI30PUN CHODO DESU" terminates at a position after the elapse of 9.8 seconds. The text "GENZAIJIKOKU WA 10JI30PUN CHODO DESU" is then displayed at the position and is scrolled at a scroll speed of 34.7 dots/s for 5.2 seconds. As a result, the text "GENZAIJIKOKU WA 10JI30PUN CHODO DESU" is displayed at a scroll speed of 34.7 dots/s for a total of 15 second. Accordingly, the text "GENZAIJIKOKU WA 10JI30PUN CHODO DESU" can be displayed naturally.

An example of karaoke display will now be described. FIG. 5 shows ornament time information added to text samples. It is assumed that ornament of a text sample T0a (Text0a) is karaoke, that the text sample T0a is 8 seconds in time length, and that the text sample T0a is "ATO 8BYO DESU." (which is a Japanese text corresponding to the English text "the remainder is 8 seconds". Highlight start time (2 seconds), the number of karaoke entries (3), highlight end time 1 (4 seconds), a start character 1 (1), an end character 1 (3), highlight end time 2 (6 seconds), a start character 2 (4), an end character 2 (7), highlight end time 3 (8 seconds), a start character 3 (8), and an end character 3 (12) are included as karaoke information, but these pieces of information are not shown.

The number of karaoke entries corresponds to the number of portions in a text to be highlighted. Therefore, if the number of karaoke entries is three, a text includes three portions to be highlighted. In this example, the three portions "ATO," "8BYO," and "DESU." are highlighted.

The text sample T0a is separated into a 4.7-second text sample T1a (Text1a) and a 3.3-second text sample T2a (Text2a). In this case, the text sample T1a includes information, such as the ornament of karaoke, the time length of 4.7 seconds, the displayed text of "ATO 8BYO DESU," and the above karaoke information (the ornament of karaoke and the time length of 4.7 seconds are included in header information and the other pieces of information are included in an ES).

In addition to these pieces of information, the ornament time information addition section 12 adds information that ornament elapsed time t1 is 0 seconds. (In FIG. 5, information that ornament display time td is 8 seconds is added. In the case of karaoke display, however, ornament display time is unnecessary. Therefore, even if ornament display time td is added, this information is ignored by the text data reproduction process section 13.)

The text sample T2a includes information, such as the ornament of karaoke, the time length of 3.3 seconds, the displayed text of "ATO 8BYO DESU," and the above karaoke information. In addition to these pieces of information, the ornament time information addition section 12 adds information that ornament elapsed time t2 is 4.7 seconds (information indicative of ornament display time td is ignored by the text data reproduction process section 13).

FIG. 6 shows the operation of displaying the text sample T1a. Ornament display time td has no influence on karaoke display, so the text data reproduction process section 13 ignores it. (In this example, ornament display time td is set and is ignored by the text data reproduction process section 13. However, the method of the ornament time information addition section 12 not setting ornament display time td may be adopted. The ornament elapsed time t1 is set to 0 seconds, so the text sample T1a is displayed from the head.

In this example, highlight is begun after 2 seconds and the first through third characters, that is to say, "ATO" are highlighted from 2 seconds for 4 seconds. The fourth through seventh characters, that is to say, "8BYO" are highlighted from 4 to 6 seconds. However, the time length of the text sample T1a is 4.7 seconds, so "8BYO" are actually highlighted from 4 to 4.7 seconds. The highlight then terminates.

FIG. 7 shows the operation of displaying the text sample T2a. Ornament display time td has no influence on display of the text sample T2a, so the text data reproduction process section 13 ignores it.

The highlight start time is set to 2 seconds. However, the ornament elapsed time t2 is set to 4.7 seconds, so highlight begins at the time of displaying the text sample T2a. Highlight of the first entry is set to 2 to 4 seconds. However, the ornament elapsed time t2 is set to 4.7 seconds, so this entry is considered to have been displayed. Highlight of the second entry is set to 4 to 6 seconds. However, the ornament elapsed time t2 is set to 4.7 seconds, so this entry is considered to have been displayed from 4 to 4.7 seconds. As a result, the fourth through seventh characters, that is to say, "8BYO" are highlighted from 4.7 to 6 (from 0 to 1.3) seconds. The eighth through twelfth characters, that is to say, "DESU." are then highlighted from 6 to 8 (from 1.3 to 3.3) seconds and the highlight terminates.

If the karaoke display shown in this example is performed by using the conventional reproduction and display method, the ornament elapsed time t2 is not added. Accordingly, when the text sample T2a is reproduced, it is impossible to know how many seconds elapsed. As a result, the text sample T2a is highlighted from the head only for 3.3 seconds and unnatural display is performed.

As has been described in the foregoing, when the one text sample T0 is separated at the separation point into the text samples T1 and T2, ornament elapsed time is added to them (if scroll display is performed, ornament display time is also added to them). The text samples T1 and T2 are reproduced and displayed on the basis of these pieces of ornament time information. This makes it possible to perform natural display while maintaining continuity between the text samples T1 and T2. Therefore, a user does not feel a malaise and high-quality text data reproduction and display can be performed.

Figure 8:
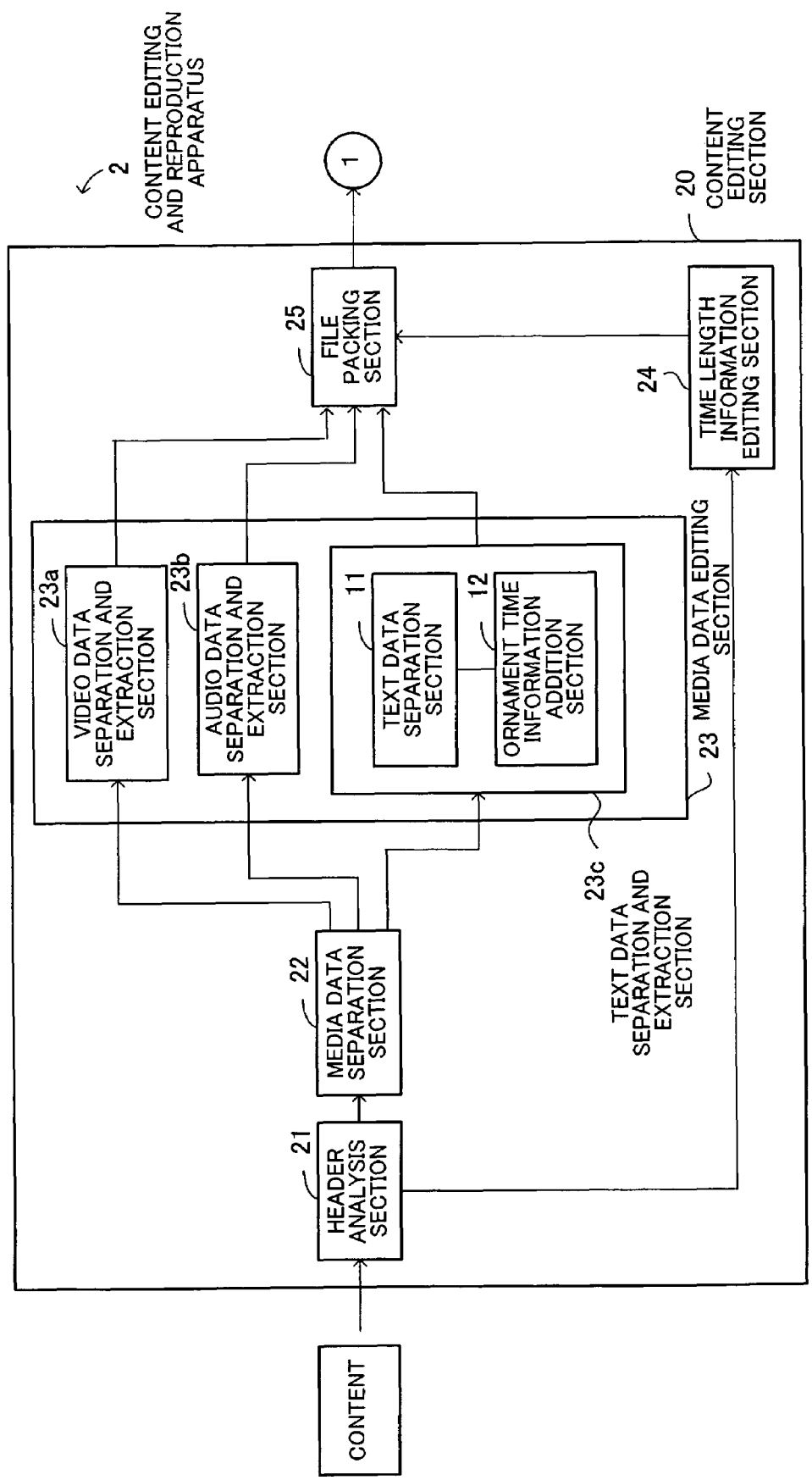
FIG. 8 shows the structure of a content editing and reproduction apparatus.
Figure 9:
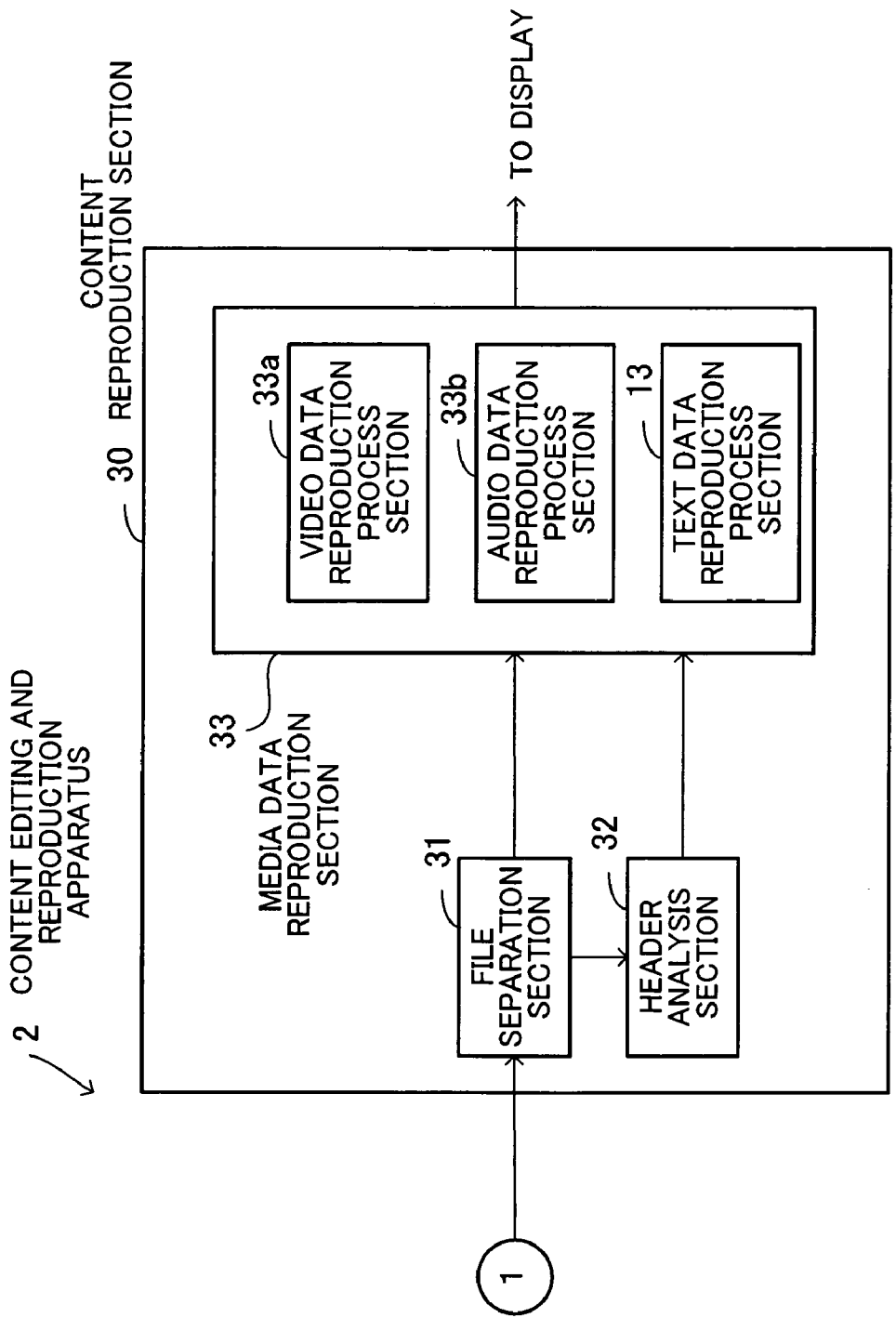
FIG. 9 shows the structure of the content editing and reproduction apparatus.

A content editing and reproduction apparatus including the function of the text editing and reproduction apparatus 10 will now be described. FIGS. 8 and 9 show the structure of a content editing and reproduction apparatus. A content editing and reproduction apparatus 2 comprises a content editing section 20 and a content reproduction section 30.

The content editing section 20 shown in FIG. 8 includes a header analysis section 21, a media data separation section 22, a media data editing section 23, a time length information editing section 24, and a file packing section 25.

The header analysis section 21 analyzes a header section of content composed of video, audio, text, and the like (composite content in the MP4 file format, for example) and determines a separation point at which a file is separated in accordance with designated time, maximum size, and the like.

The media data separation section 22 separates video data, audio data, and text data from a media data section of the content as media ESes. The media data editing section 23 includes a video data separation and extraction section 23a, an audio data separation and extraction section 23b, and a text data separation and extraction section 23c. The text data separation and extraction section 23c includes the text data separation section 11 and the ornament time information addition section 12 described in FIG. 1.

The video data separation and extraction section 23a separates and extracts the video data on the basis of the separation point. The audio data separation and extraction section 23b separates and extracts the audio data on the basis of the separation point. The operation of the text data separation and extraction section 23c is the same as that of the text data separation section 11 and the ornament time information addition section 12 described in FIG. 1.

The time length information editing section 24 edits time length information included in the header section in accordance with the separation method determined by the header analysis section 21. For example, it is assumed that the time lengths of text samples T1 and T2 obtained by a separation are 9.8 seconds and 5.2 seconds respectively. Then time information included in header information of a file in which the text sample T1 is stored is edited to 9.8 seconds and time information included in header information of a file in which the text sample T2 is stored is edited to 5.2 seconds.

The file packing section 25 adds the header information in which the time length information is edited by the time length information editing section 24 to the edited video data, audio data, and text data and packs them in a new MP4 file.

The content reproduction section 30 shown in FIG. 9 includes a file separation section 31, a header analysis section 32, and a media data reproduction section 33. The media data reproduction section 33 includes a video data reproduction process section 33a, an audio data reproduction process section 33b, and the text data reproduction process section 13 described in FIG. 1.

The file separation section 31 receives a content file edited, separates the content file into a header section and a media data section of content, and sends the header section and the media data section to the header analysis section 32 and the media data reproduction section 33 respectively. The header analysis section 32 analyzes header information and holds and manages CODEC information, time information, size information, offset information, and the like.

The media data reproduction section 33 includes the video data reproduction process section 33a, the audio data reproduction process section 33b, and the text data reproduction process section 13 and reproduces video data, audio data, and text data on the basis of the information obtained by the analysis performed by the header analysis section 32. For example, if the information that the audio data is encoded by using the MPEG audio layer 3 (MP3) is obtained by the analysis performed by the header analysis section 32, then the audio data reproduction process section 33b performs a decoding process corresponding to the MP3.

Figure 10:
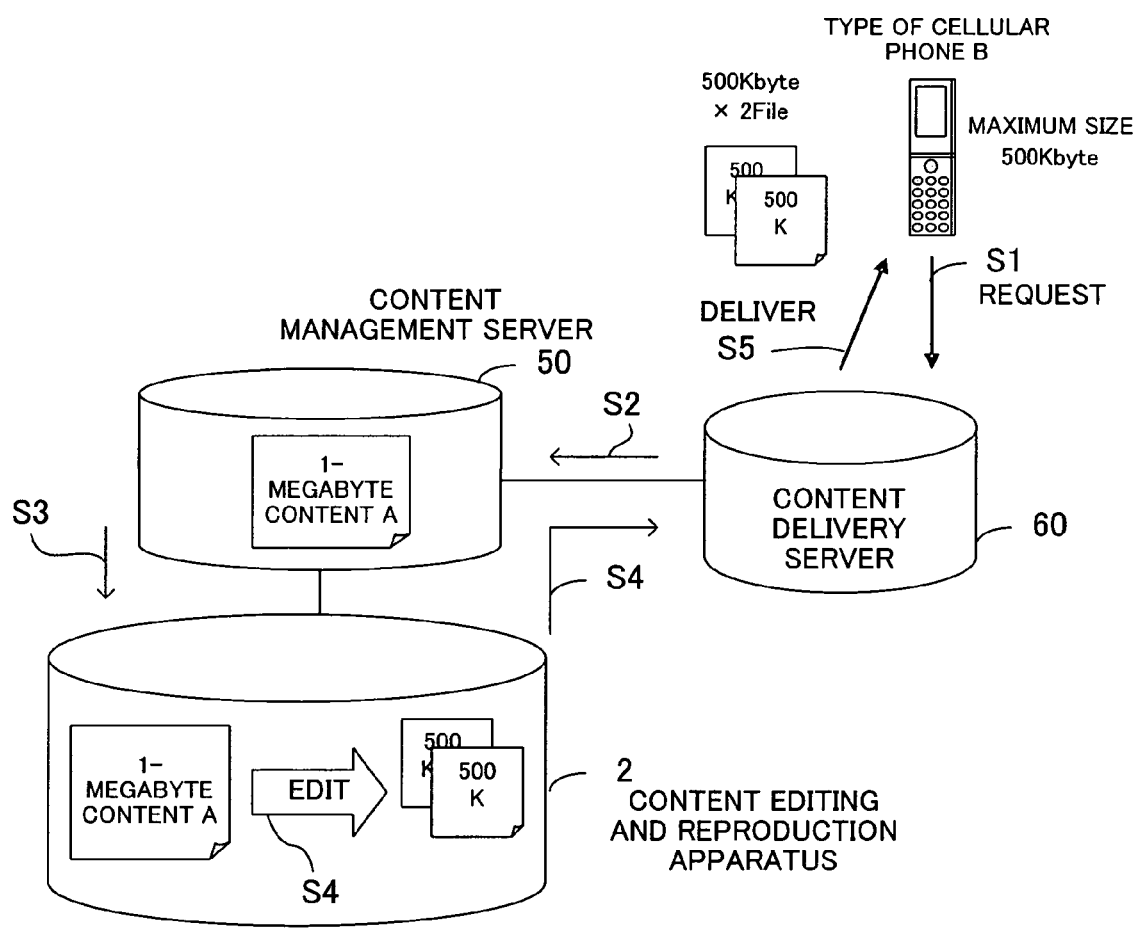
FIG. 10 shows an example of content delivery services.

An example of content delivery services to which the content editing and reproduction apparatus 2 according to the present invention is applied will now be described. FIG. 10 shows an example of content delivery services.

[S1] A user sends a content delivery server 60 a type of his/her cellular telephone and content information.

[S2] The content delivery server 60 sends a content management server 50 maximum size corresponding to the type of the user's cellular telephone and the content information to make a request to obtain content.

[S3] The content management server 50 requests the content editing and reproduction apparatus 2 to separate and edit the content to be edited on the basis of the maximum size.

[S4] The content editing and reproduction apparatus 2 edits the content to be edited and sends composite content to the content delivery server 60 via the content management server 50.

[S5] The content delivery server 60 delivers the edited composite content received to the user.

Figure 11:
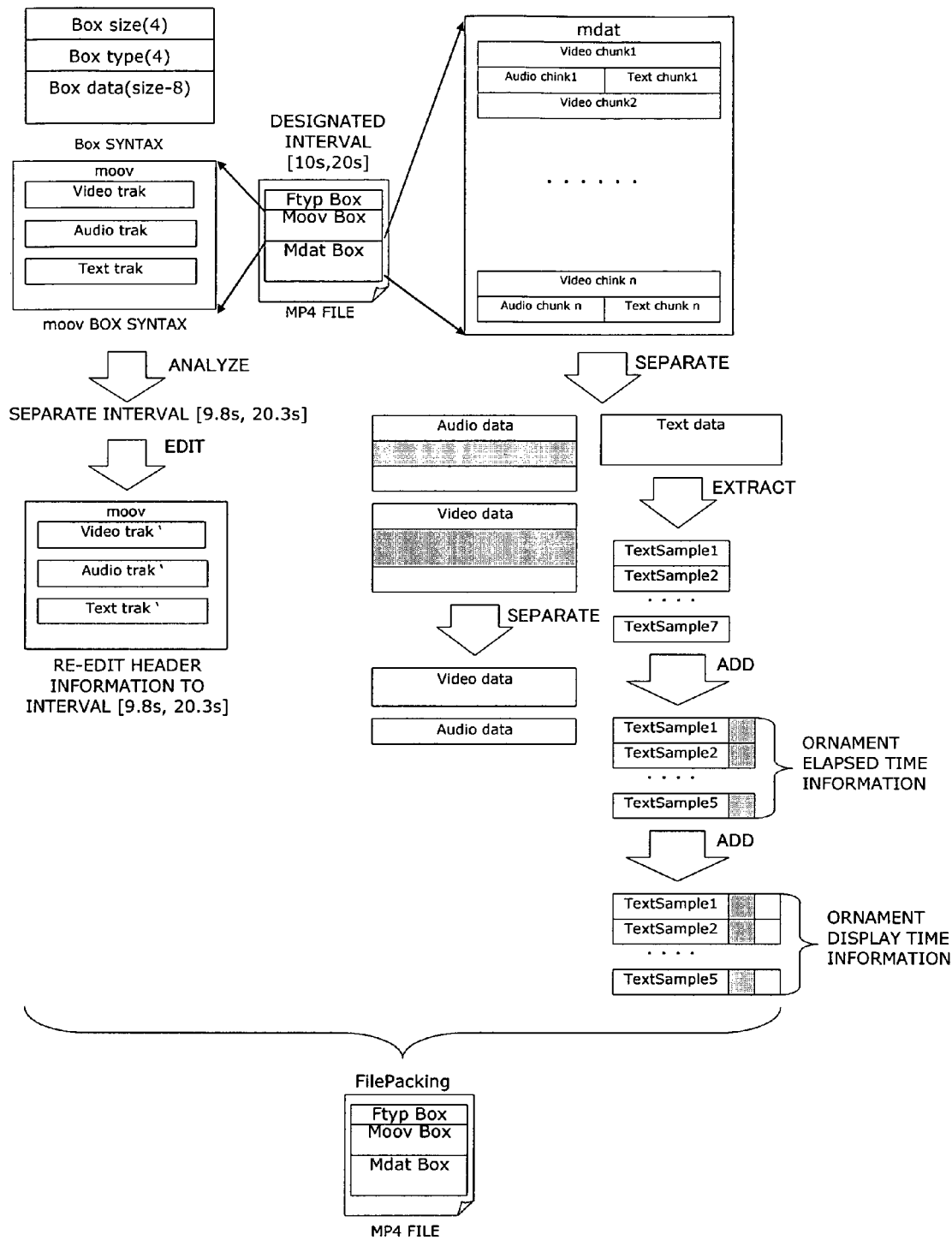
FIG. 11 shows an example of how to edit content in the MP4 file format.
Figure 12:
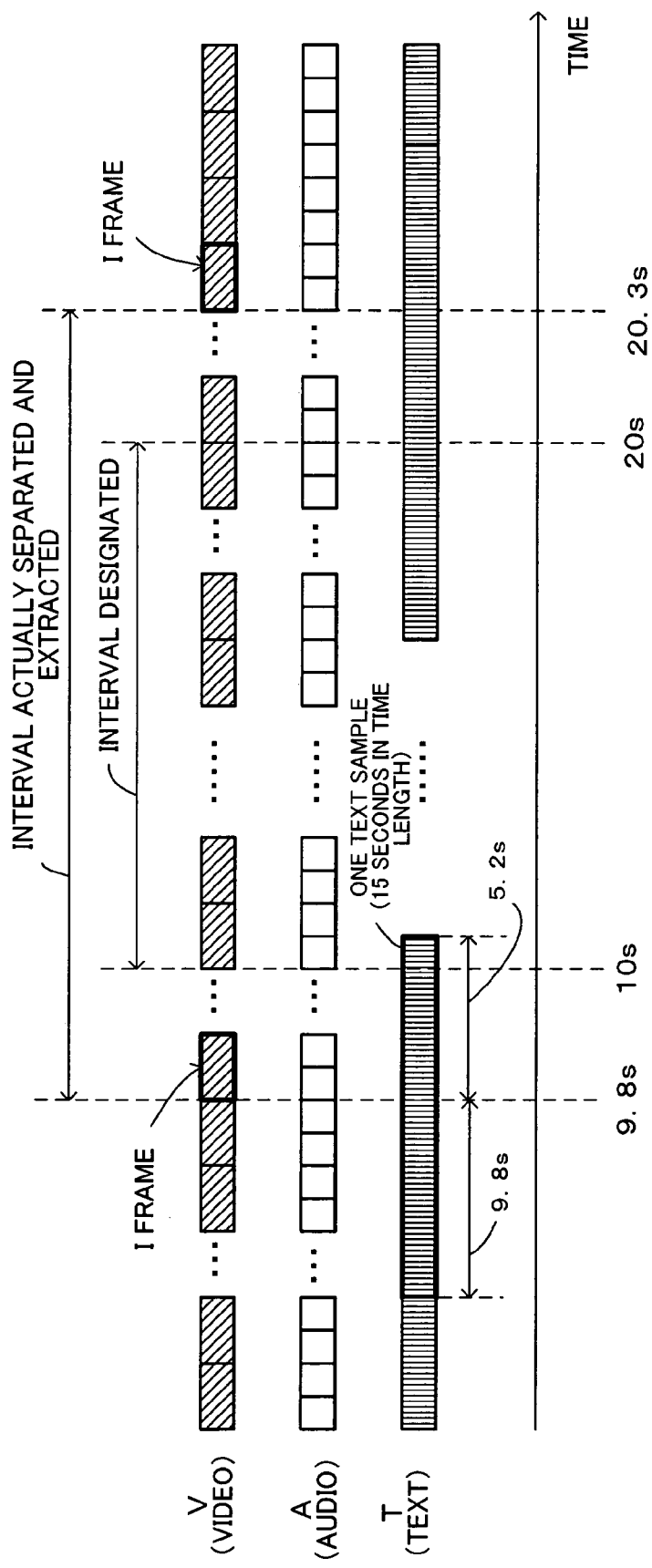
FIG. 12 shows how to separate and extract media data.
Figure 15:
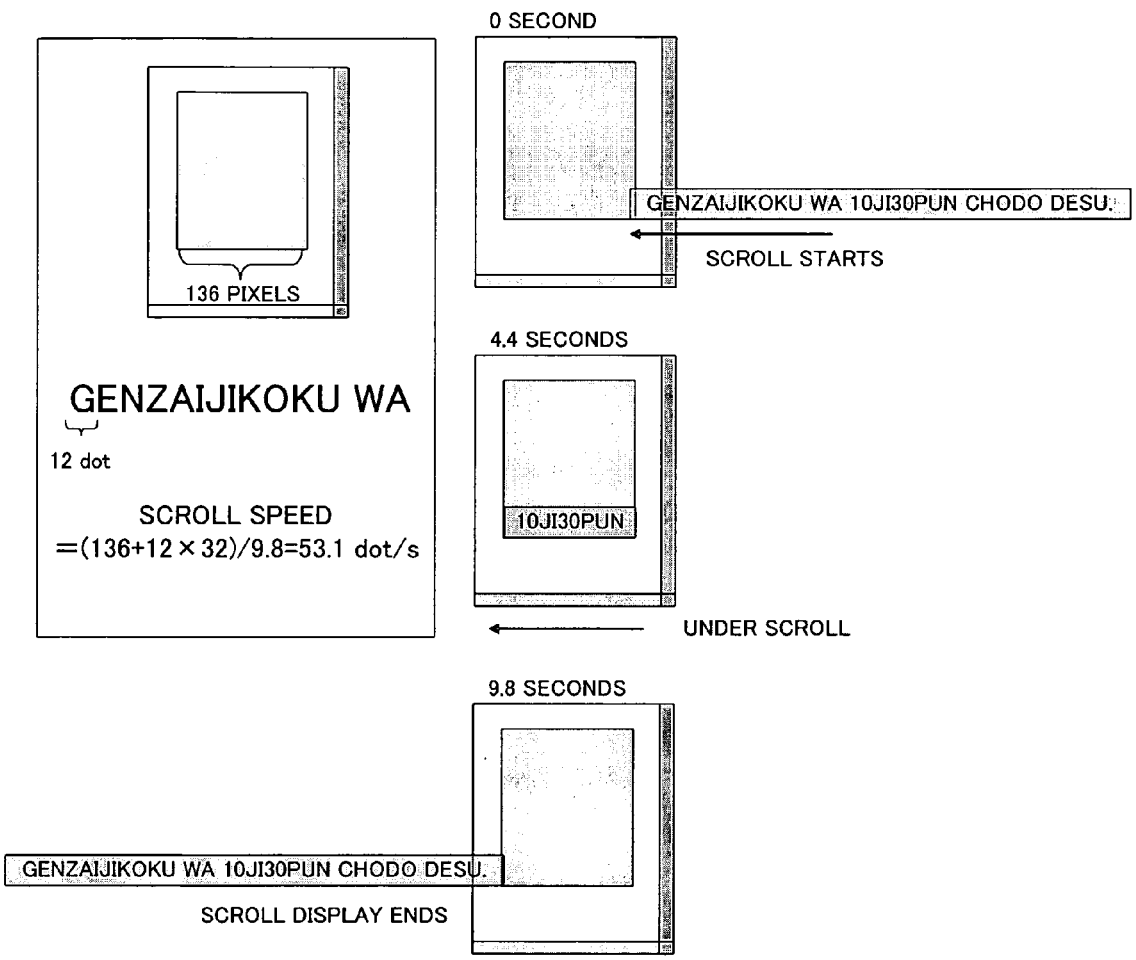
FIG. 15 shows the operation of displaying 9.8-second text data.
Figure 16:
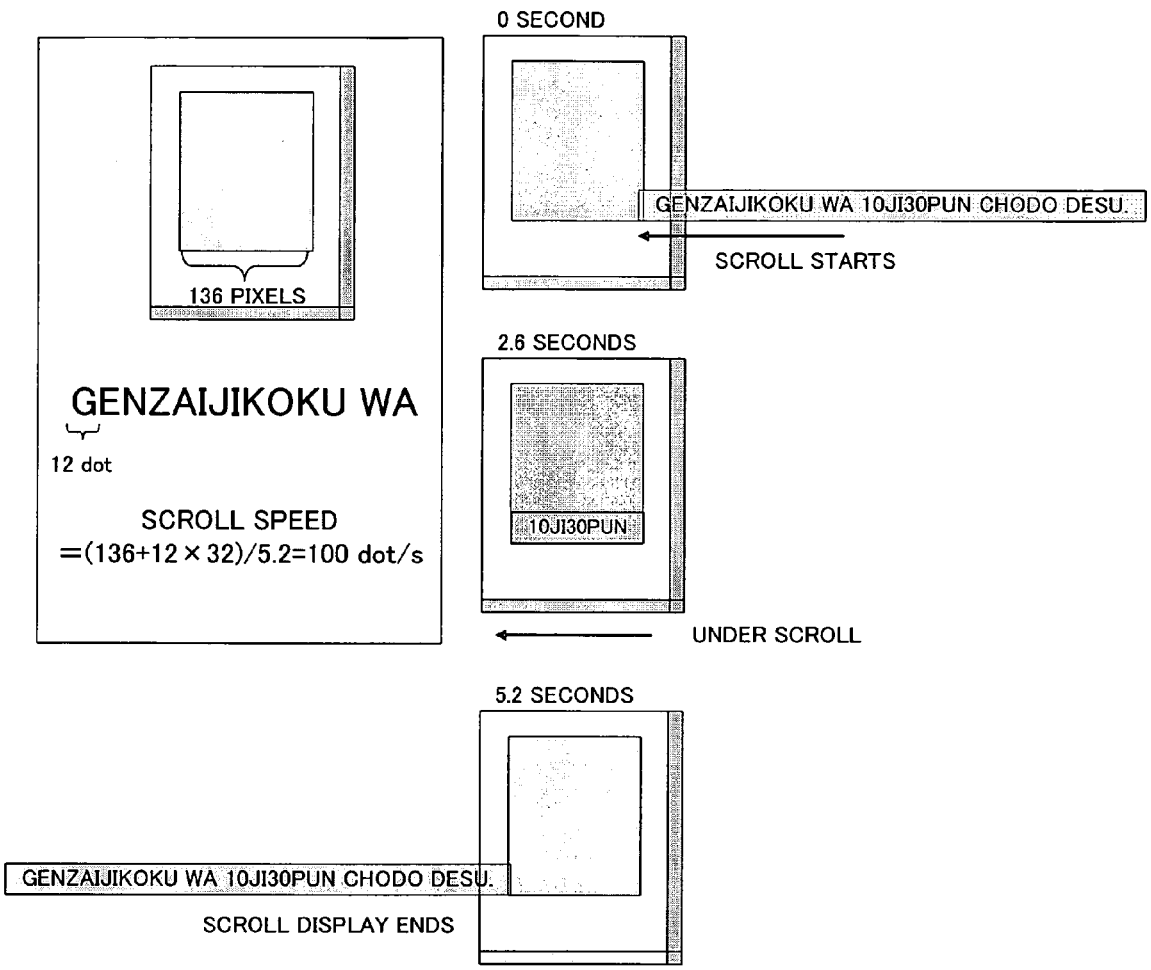
FIG. 16 shows the operation of displaying 5.2-second text data.

An example of how to edit content in the MP4 file format will now be described. FIG. 11 shows an example of how to edit content in the MP4 file format. An MP4 file includes a moov box, being a header information section where information such as a media data reproduction condition is stored, and an mdat box, being a media data section where only media data streams are stored.

The moov box is made up of a video trak box where information such as a video data reproduction condition is stored, an audio trak box where information such as an audio data reproduction condition is stored, and a text trak box where a text data reproduction condition is stored. The mdat box stores several samples of the same media data in block as a chunk.

When a predetermined time interval is extracted from the MP4 file having the above structure and is edited as an MP4 file, the flow of an editing process is as follows.

(1) After the header section of the MP4 file is analyzed, a designated separation interval for video data, audio data, and text data is determined.

(2) The video data, the audio data, and the text data are separated.

(3) Only video data corresponding to the separation interval is extracted from the video data.

(4) Only audio data corresponding to the separation interval is extracted from the audio data.

(5a) Text data is extracted by the text sample.

(5b) Only text samples corresponding to the separation interval are extracted and ornament elapsed time information is added to them. If scroll display is performed, ornament display time information is also added to them.

(6) The extracted video data, audio data, and text data and time-edited header information are packed in an MP4 file.

As has been described in the foregoing, in the present invention ornament time information, such as ornament elapsed time and ornament display time, is added to text data. Accordingly, even if a text sample is separated at a separation point, it is possible to naturally display the text sample while maintaining the continuity of the text data. In this case, a user does not feel a malaise. In addition, it is possible to easily edit and reproduce the text data without destroying the MP4 file format.

With the text editing and reproduction apparatus according to the present invention, a text sample is separated into a first text sample and a second text sample. First ornament elapsed time, being display start time for the first text sample, is added to the first text sample and second ornament elapsed time, being display start time for the second text sample, is added to the second text sample. The first text sample is reproduced and displayed from the first ornament elapsed time to the time when the text sample is separated, and the second text sample is reproduced and displayed from the second ornament elapsed time. By doing so, a reproduction process is performed with continuity between the first text sample and the second text sample maintained. This eliminates unnatural display operation performed at the time of separating and displaying text data. Therefore, it is possible to perform high-quality text data reproduction and display while maintaining the continuity of text data.

Moreover, with the content editing and reproduction apparatus according to the present invention, a text sample is separated into a first text sample and a second text sample. First ornament elapsed time, being display start time for the first text sample, is added to the first text sample and second ornament elapsed time, being display start time for the second text sample, is added to the second text sample. The first text sample is reproduced and displayed from the first ornament elapsed time to the time when the text sample is separated, and the second text sample is reproduced and displayed from the second ornament elapsed time. By doing so, a reproduction process is performed with continuity between the first text sample and the second text sample maintained. This eliminates unnatural display operation performed at the time of separating and displaying text data. Therefore, it is possible to perform high-quality text data reproduction and display while maintaining the continuity of text data.

In addition, with the data editing and reproduction method according to the present invention, a text sample is separated into a first text sample and a second text sample. First ornament elapsed time, being display start time for the first text sample, is added to the first text sample and second ornament elapsed time, being display start time for the second text sample, is added to the second text sample. The first text sample is reproduced and displayed from the first ornament elapsed time to the time when the text sample is separated, and the second text sample is reproduced and displayed from the second ornament elapsed time. By doing so, a reproduction process is performed with continuity between the first text sample and the second text sample maintained. This eliminates unnatural display operation performed at the time of separating and displaying text data. Therefore, it is possible to perform high-quality text data reproduction and display while maintaining the continuity of text data.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A text editing and reproduction apparatus for editing and reproducing text data, the apparatus comprising:
    a text data separation section to treat, in a case of separating a text sample which is one sample of the text data at the time of separating and editing the text data, text data before a separation point as a first text sample, and to treat text data following the separation point as a second text sample, the text sample before the separation including a character string, each of the first text sample and the second text sample including the character string;
    an ornament time information addition section to add to the first text sample a first ornament elapsed time which indicates elapsed time for ornament display of the text sample and which is a display start time for the first text sample, and to add to the second text sample a second ornament elapsed time which indicates elapsed time for ornament display of the text sample and which is a display start time for the second text sample; and
    a text data reproduction process section to perform a reproduction process while maintaining continuity between the first text sample and the second text sample by reproducing and displaying on a screen the first text sample from the first ornament elapsed time to the time when the text sample is separated and by reproducing and displaying on the screen the second text sample from the second ornament elapsed time,
    wherein when reproducing and displaying the second text sample, the text data reproduction process section determines a start position of scroll display based on the second ornament elapsed time, displays the character string included in the second text sample at the start position determined, and scrolls the character string on the screen.

2. The text editing and reproduction apparatus according to claim 1, wherein:
    the ornament time information addition section adds to the first text sample not only the first ornament elapsed time but also an ornament display time which indicates time taken to perform ornament display of the text sample before the separation and adds to the second text sample not only the second ornament elapsed time but also the ornament display time; and
    the text data reproduction process section calculates an ornament display speed of the text sample from the ornament display time, reproduces and displays the first text sample at the ornament display speed from the first ornament elapsed time to the time when the text sample is separated, and reproduces and displays the second text sample at the ornament display speed from the second ornament elapsed time.

3. The text editing and reproduction apparatus according to claim 2, wherein the ornament time information addition section sets the first ornament elapsed time to zero and sets the second ornament elapsed time to the time when the text sample is separated.

4. A content editing and reproduction apparatus for editing and reproducing content composed of video, audio, and text, the apparatus comprising:
    a header analysis section to analyze, at the time of separating, extracting, and editing a predetermined time interval of the content, a header section of the content and to determine a separation point at which the content is separated;
    a video data separation and extraction section to separate and extract video data on the basis of the separation point;
    an audio data separation and extraction section to separate and extract audio data on the basis of the separation point;
    a text data separation and extraction section to separate text data on the basis of the separation point, the text data separation and extraction section including:
        a text data separation section to treat, in the case of separating a text sample which is one sample of the text data, text data before the separation point as a first text sample, and to treat text data following the separation point as a second text sample, the text sample before the separation including a character string, each of the first text sample and the second text sample including the character string; and
        an ornament time information addition section to add to the first text sample a first ornament elapsed time which indicates elapsed time for ornament display of the text sample and which is a display start time for the first text sample, and to add to the second text sample a second ornament elapsed time which indicates elapsed time for ornament display of the text sample and which is a display start time for the second text sample;

a file packing section to pack the video data, the audio data, and the text data extracted in a file;

a video data reproduction process section to reproduce the video data included in content packed in the file;

an audio data reproduction process section to reproduce the audio data included in the content packed in the file; and a text data reproduction process section to perform, at the time of reproducing the text data included in the content packed in the file, a reproduction process while maintaining continuity between the first text sample and the second text sample by reproducing and displaying on a screen the first text sample from the first ornament elapsed time to the time when the text sample is separated and by reproducing and displaying on the screen the second text sample from the second ornament elapsed time, wherein when reproducing and displaying the second text sample, the text data reproduction process section determines a start position of scroll display based on the second ornament elapsed time, displays the character string included in the second text sample at the start position determined, and scrolls the character string on the screen.

5. The content editing and reproduction apparatus according to claim 4, wherein:

the ornament time information addition section adds to the first text sample not only the first ornament elapsed time but also an ornament display time which indicates time taken to perform ornament display of the text sample before the separation and adds to the second text sample not only the second ornament elapsed time but also the ornament display time; and the text data reproduction process section calculates an ornament display speed of the text sample from the ornament display time, reproduces and displays the first text sample at the ornament display speed from the first ornament elapsed time to the time when the text sample is separated, and reproduces and displays the second text sample at the ornament display speed from the second ornament elapsed time.

6. The content editing and reproduction apparatus according to claim 5, wherein the ornament time information addition section sets the first ornament elapsed time to zero and sets the second ornament elapsed time to the time when the text sample is separated.

7. A text editing and reproduction method for editing and reproducing text data, the method comprising:

separating the text data;

treating, in the case of separating a text sample which is one sample of the text data, text data before a separation point as a first text sample, and treating text data following the separation point as a second text sample, the text sample before the separation including a character string, each of the first text sample and the second text sample including the character string;

adding to the first text sample a first ornament elapsed time which indicates elapsed time for ornament display of the text sample and which is a display start time for the first text sample;

adding to the second text sample a second ornament elapsed time which indicates elapsed time for ornament display of the text sample and which is a display start time for the second text sample;

reproducing and displaying on a screen the first text sample from the first ornament elapsed time to the time when the text sample is separated; and reproducing and displaying on the screen the second text sample from the second ornament elapsed time to perform a reproduction process while maintaining continuity between the first text sample and the second text sample, wherein when reproducing and displaying the second text sample:

a start position of scroll display is determined based on the second ornament elapsed time; and the character string included in the second text sample is displayed at the start position determined and is scrolled on the screen.

8. The text editing and reproduction method according to claim 7, wherein:

not only the first ornament elapsed time but also an ornament display time is added to the first text sample, the ornament display time indicating time taken to perform ornament display of the text sample before the separation;

not only the second ornament elapsed time but also the ornament display time is added to the second text sample;

an ornament display speed of the text sample is calculated from the ornament display time;

the first text sample is reproduced and displayed at the ornament display speed from the first ornament elapsed time to the time when the text sample is separated; and the second text sample is reproduced and displayed at the ornament display speed from the second ornament elapsed time.

9. The text editing and reproduction method according to claim 8, wherein:

the first ornament elapsed time is set to zero; and the second ornament elapsed time is set to the time when the text sample is separated.

10. A text editing and reproduction apparatus for editing and reproducing text data, the apparatus comprising:

a text data separation section to treat, in a case of separating a text sample which is one sample of the text data at the time of separating and editing the text data, text data before a separation point as a first text sample, and to treat text data following the separation point as a second text sample, the text sample including text characters, each of the first text sample and the second text sample including the text characters;

an ornament time information addition section to add to the first text sample a first ornament elapsed time which indicates elapsed time for ornament display of the text sample and which is a display start time for the first text sample, and to add to the second text sample a second ornament elapsed time which indicates elapsed time for ornament display of the text sample and which is a display start time for the second text sample; and a text data reproduction process section to perform a reproduction process while maintaining continuity between the first text sample and the second text sample by reproducing and displaying on a screen the first text sample from the first ornament elapsed time to the time when the text sample is separated and by reproducing and displaying on the screen the second text sample from the second ornament elapsed time, wherein when reproducing and displaying the second text sample, the text data reproduction process section selects based on the second ornament elapsed time a start character to be highlighted from the text characters included in the second text sample, highlights the start character selected, and changes a highlighted character with the elapse of time.

11. A content editing and reproduction apparatus for editing and reproducing content composed of video, audio, and text, the apparatus comprising:
   a header analysis section to analyze, at the time of separating, extracting, and editing a predetermined time interval of the content, a header section of the content and to determine a separation point at which the content is separated;
   a video data separation and extraction section to separate and extract video data on the basis of the separation point;
   an audio data separation and extraction section to separate and extract audio data on the basis of the separation point;
   a text data separation and extraction section to separate text data on the basis of the separation point, the text data separation and extraction section including:
      a text data separation section to treat, in the case of separating a text sample which is one sample of the text data, text data before the separation point as a first text sample, and to treat text data following the separation point as a second text sample, the text sample including text characters, each of the first text sample and the second text sample including the text characters; and
      an ornament time information addition section to add to the first text sample a first ornament elapsed time which indicates elapsed time for ornament display of the text sample and which is a display start time for the first text sample, and to add to the second text sample a second ornament elapsed time which indicates elapsed time for ornament display of the text sample and which is a display start time for the second text sample;
   a file packing section to pack the video data, the audio data, and the text data extracted in a file;
   a video data reproduction process section to reproduce the video data included in content packed in the file;
   an audio data reproduction process section to reproduce the audio data included in the content packed in the file; and
   a text data reproduction process section to perform, at the time of reproducing the text data included in the content packed in the file, a reproduction process while maintaining continuity between the first text sample and the second text sample by reproducing and displaying on a screen the first text sample from the first ornament elapsed time to the time when the text sample is separated and by reproducing and displaying on the screen the second text sample from the second ornament elapsed time,
   wherein when reproducing and displaying the second text sample, the text data reproduction process section selects based on the second ornament elapsed time a start character to be highlighted from the text characters included in the second text sample, highlights the start character selected, and changes a highlighted character with the elapse of time.

12. A text editing and reproduction method for editing and reproducing text data, the method comprising:
   separating the text data;
   treating, in the case of separating a text sample which is one sample of the text data, text data before a separation point as a first text sample, and treating text data following the separation point as a second text sample, the text sample including text characters, each of the first text sample and the second text sample including the text characters;
   adding to the first text sample a first ornament elapsed time which indicates elapsed time for ornament display of the text sample and which is a display start time for the first text sample;
   adding to the second text sample a second ornament elapsed time which indicates elapsed time for ornament display of the text sample and which is a display start time for the second text sample;
   reproducing and displaying on a screen the first text sample from the first ornament elapsed time to the time when the text sample is separated; and
   reproducing and displaying on the screen the second text sample from the second ornament elapsed time to perform a reproduction process while maintaining continuity between the first text sample and the second text sample,
   wherein when reproducing and displaying the second text sample:
   a start character to be highlighted is selected based on the second ornament elapsed time from the text characters included in the second text sample;
   the start character selected is highlighted; and
   a highlighted character is changed with the elapse of time.

* * * * *